United States Patent
Hsieh et al.

(10) Patent No.: US 7,945,900 B2
(45) Date of Patent: May 17, 2011

(54) DEBUGGING TOOL FOR DEBUGGING MULTI-THREADED PROGRAMS

(75) Inventors: Cheng-Hsueh Hsieh, San Jose, CA (US); Jason Dai, Shanghai (CN); Boris Beylin, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 2148 days.

(21) Appl. No.: 10/835,083

(22) Filed: Apr. 29, 2004

(65) Prior Publication Data
US 2005/0246691 A1    Nov. 3, 2005

(51) Int. Cl.
*G06F 9/44* (2006.01)
(52) U.S. Cl. ............... 717/129; 717/124; 717/127
(58) Field of Classification Search .......... 717/124–127, 717/131–135
See application file for complete search history.

(56) References Cited

U.S. PATENT DOCUMENTS

| | | | | |
|---|---|---|---|---|
| 5,632,032 A | * | 5/1997 | Ault et al. | 718/100 |
| 5,953,530 A | * | 9/1999 | Rishi et al. | 717/127 |
| 6,378,125 B1 | * | 4/2002 | Bates et al. | 717/129 |
| 6,823,518 B1 | * | 11/2004 | Bliss et al. | 719/310 |
| 7,328,429 B2 | * | 2/2008 | Hooper et al. | 717/128 |

OTHER PUBLICATIONS

Windows 2000 Kernel Debugging, Steven McDowell, Jan. 5, 2001, pp. vii-30, 69-126, 137-147.*
"How Debuggers Work" J.B. Rosenberg, Whole Book, 1996.*
"Mesa Debugger Documentation" version 5.0 1979, 33 pages.*
Wismuller et al. "Interactive debugging and performance analysis of massively parallel applications," received May 18, 1995; revised Dec. 1995.*

* cited by examiner

*Primary Examiner* — Lewis A Bullock, Jr.
*Assistant Examiner* — Michael Yaary (57) ABSTRACT

A method includes running a debugging tool in regard to a program which is undergoing debugging. The program may support multi-threaded operation. The method further includes presenting an option to a user via the debugging tool with respect to a program instruction in a first thread of the program. The program instruction may be for putting an item of data into a queue. The method also includes, if the user exercises the option, identifying a program instruction in a second thread of the program. The second thread is different from the first thread. The identified program instruction in the second thread may be for getting the item of data from the queue. The method further includes stopping execution of the program at the identified program instruction in the second thread.

10 Claims, 9 Drawing Sheets

DEBUGGING TOOL FOR DEBUGGING MULTI-THREADED PROGRAMS

BACKGROUND

Software programs known a "debugging tools" are widely used by software developers. The purpose of a debugging tool is to allow a software developer to examine for errors a software program that is under development. Functions such as "Step Into", "Step Over", "Step Out" and "Run to Cursor" allow the user to effectively "freeze" execution of the program under examination at a given program instruction, to allow checking of variable values, memory contents, etc., and to gain insight into the workings of the program under examination.

Some programs support multi-threaded operation, either by original design or as a result of being partitioned into threads upon compiling. Multi-threaded operation can result in significant efficiencies, but conventional debugging tools do not readily allow for tracing of synchronization signals or of data passed across thread boundaries.

DETAILED DESCRIPTION

Figure 1:
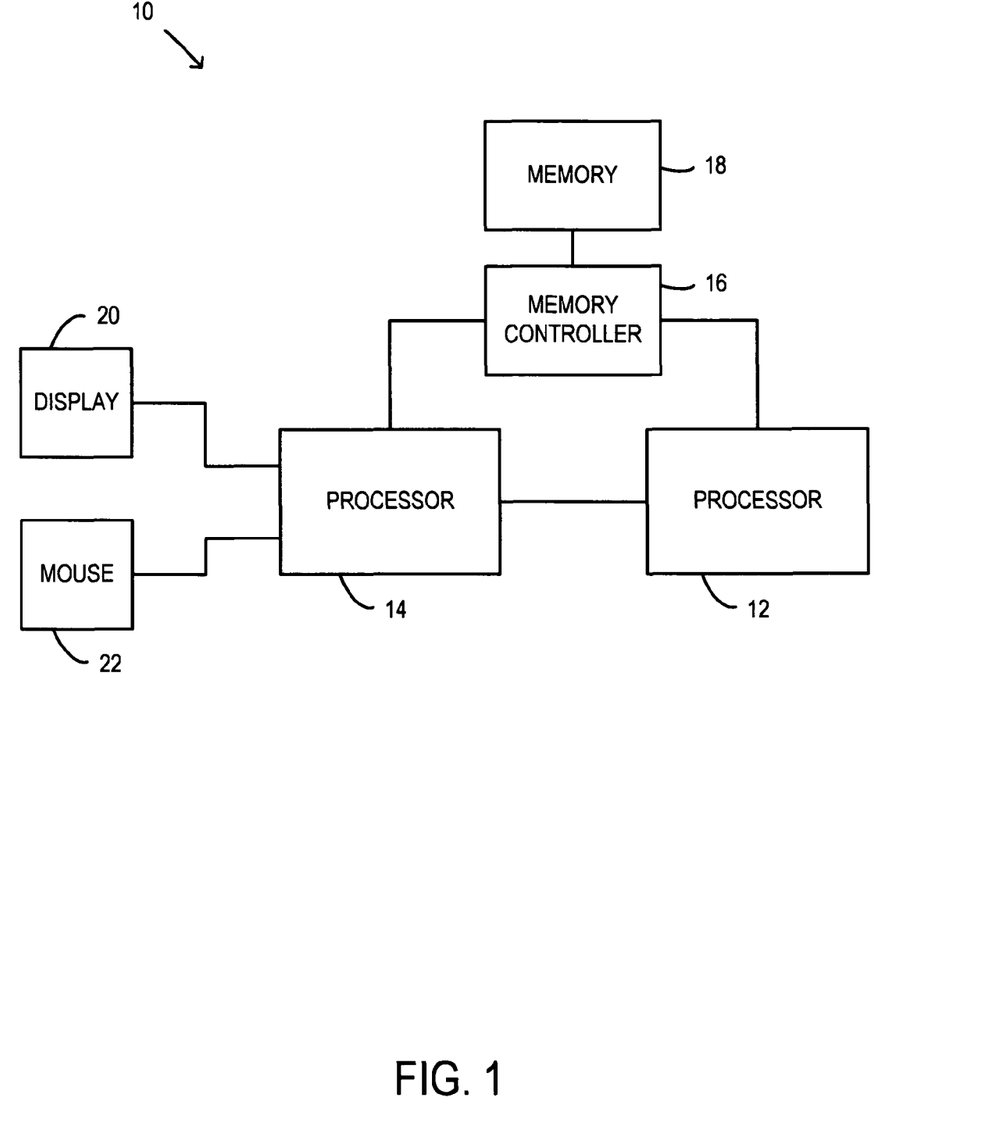
FIG. 1 is block diagram of a computer system according to some embodiments.

FIG. 1 is a block diagram of a computer system 10 according to some embodiments. In its hardware aspects, the computer system 10 may, but need not be, constituted entirely of conventional components.

The computer system 10 includes a first processor 12 and a second processor 14 coupled to the first processor 12. The processors 12 and 14 may be, in some embodiments, conventional microprocessors. The computer system 10 also includes a memory controller 16 coupled to the processors 12 and 14. Also included in the computer system 10 are one or more memory devices 18 coupled to the processors 12 and 14 via the memory controller 16. The memory device(s) 18 may store the program which is to undergo debugging as well as a debugging tool according to some embodiments. The program to be debugged may run on the first processor 12 and the debugging tool may run on the second processor 14, which may control the first processor 12 to periodically interrupt and resume execution of the program to be debugged under control of the debugging tool.

The memory controller 16 may include a queue accelerator (not separately shown) which may operate to facilitate creation, maintenance and use of one or more data queues in the memory device(s) 18.

The computer system 10 may also include one or more input/output devices (e.g., a display device 20 and a computer mouse 22, both coupled to the second processor 14) by which the user may provide input to the computer system and may receive output from the computer system. Other conventional devices such as a keyboard (not shown) may also be included in the computer system.

Figure 2:
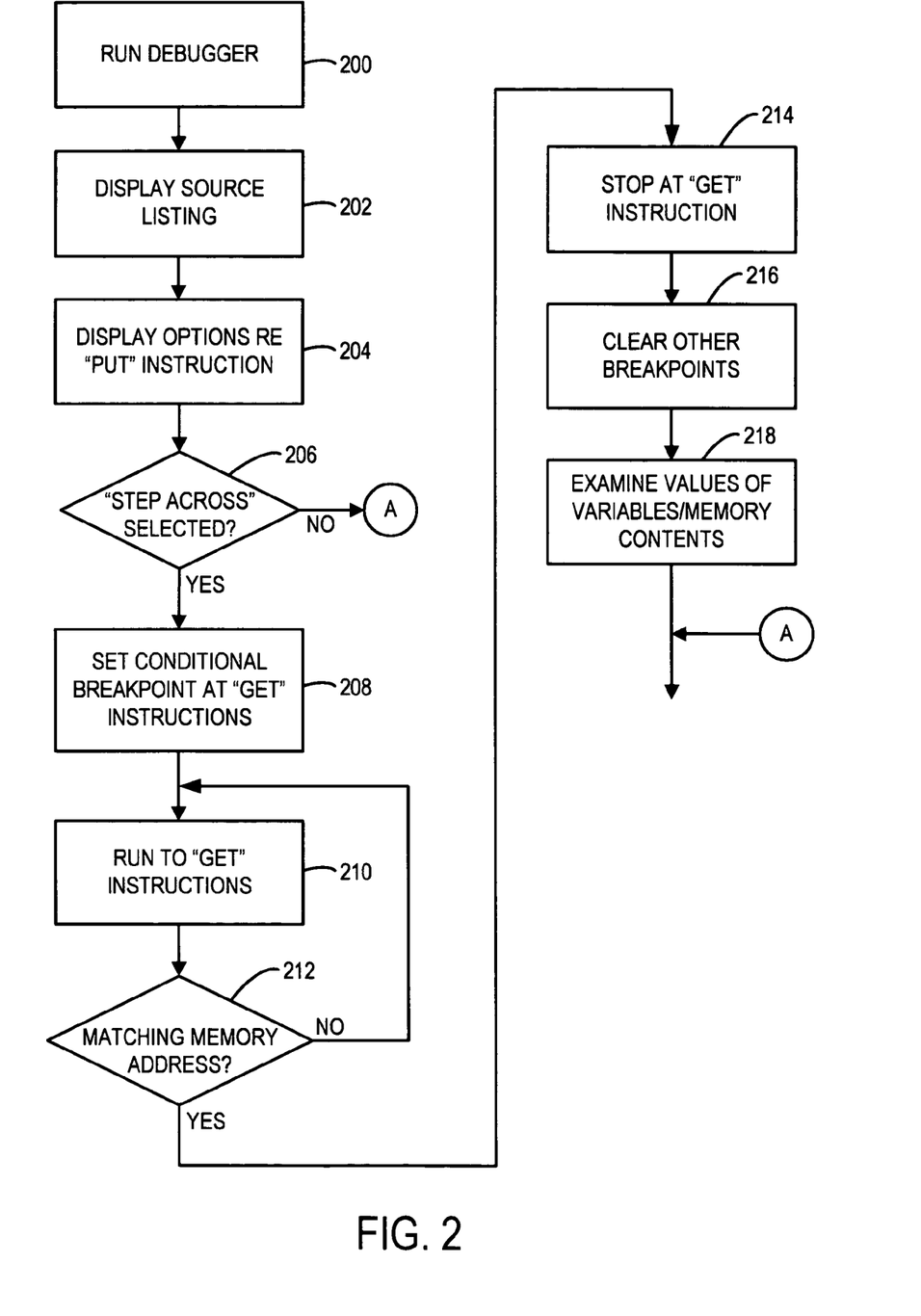
FIG. 2 is a flow chart that illustrates a function of a debugging tool according to some embodiments.

FIG. 2 is a flow chart that illustrates a function of a debugging tool according to some embodiments.

Figure 3:
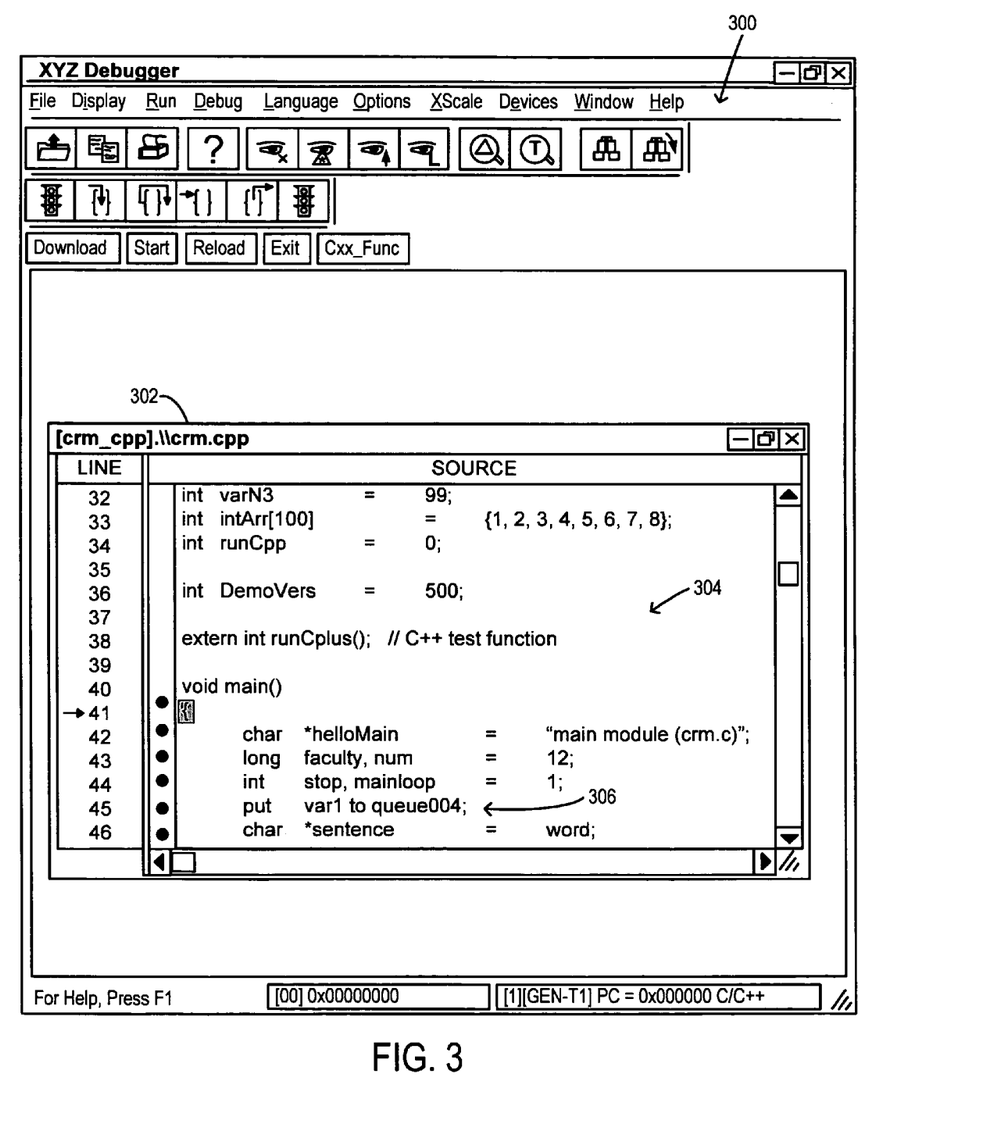
FIGS. 3 and 4 are example screen displays that may be provided in accordance with the function of FIG. 2.

At 200 in FIG. 2, the debugging tool (also referred to as the "debugger") is caused to execute ("run") on the second processor 14. As part of the operation of the computer system under (at least partial) control of the debugger, a screen display like that shown in FIG. 3 may be displayed to the user via the display device 20. The screen display of FIG. 3 may include a toolbar 300 which may permit actuation of at least some conventional features of debugging tools. In addition, the screen display of FIG. 3 may include a source window 302 in which a (e.g., partial) source listing 304 is displayed (as per 202 in FIG. 2). The source listing 304 lists source code program instructions of the program that is being debugged. It will be assumed that the program supports multi-threaded operation, either by design or as a result of partitioning by the compiler. It will also be assumed that the "put" instruction 306 included in the source listing 304 is part of a first execution thread of the program and operates to put an item of data (i.e., the value of a variable) to a queue for consumption by another execution thread of the program.

The "put" instruction 306 may be selected by the user by, for example, using the mouse 22 (FIG. 1) to position a cursor 400 (FIG. 4) adjacent to the "put" instruction 306 and then, e.g., "right-clicking" (i.e., clicking a right-hand button (not separately shown) of the mouse 22). In response to the "right-clicking" (i.e., in response to the selecting of the "put" instruction), a context menu 402 is displayed, as indicated at 204 in FIG. 2. The context menu 402 includes a "Step Across" option 404 (FIG. 4) with respect to the "put" instruction 306.

Figure 4:
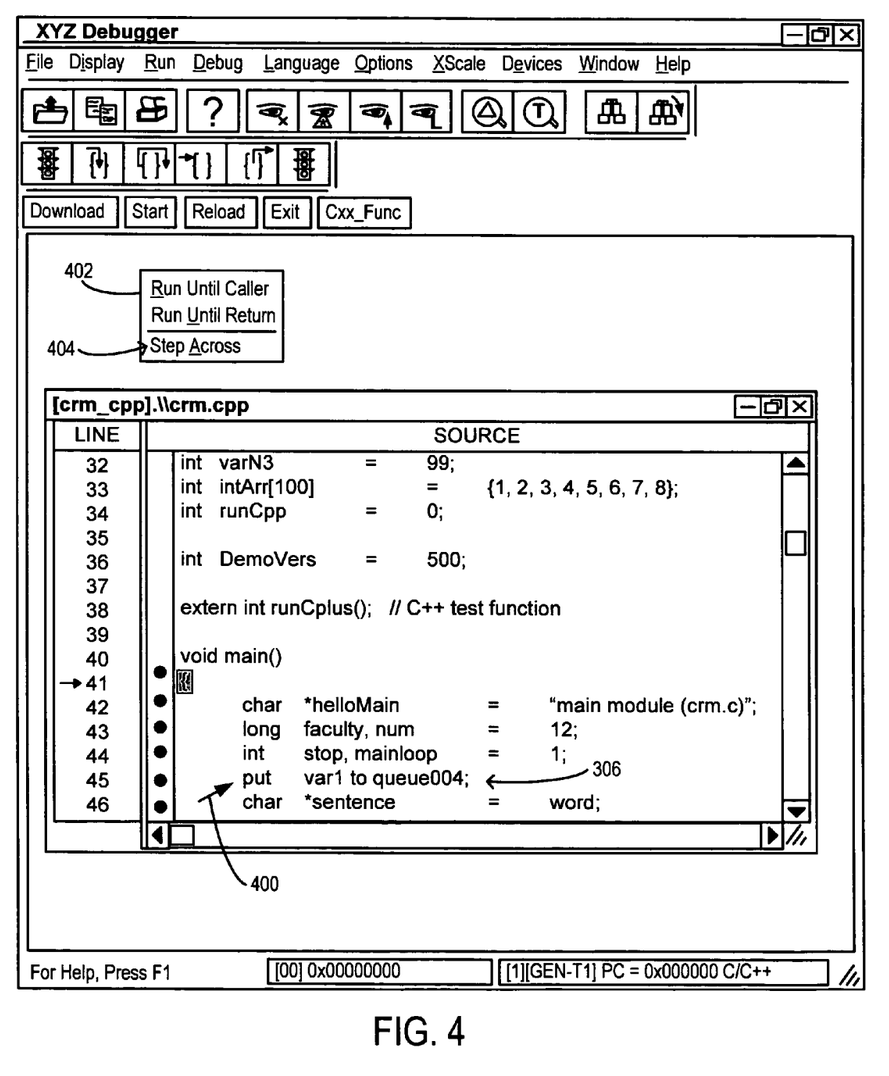

At 206 in FIG. 2, it is determined whether the user has selected the "Step Across" option 404. Selection of the "Step Across" option may occur by, e.g., the user operating the mouse 22 and/or the keyboard. If it is determined that the user has selected the "Step Across" option, the debugger sets conditional breakpoints (as indicated at 208 in FIG. 2) at one or more "get" instructions in one or more threads other than the thread of which the "put" instruction 306 is a part and/or in the same thread. The condition for the breakpoints is whether the memory location from which the respective get instruction gets the data is the same as the memory location to which the "put" instruction 306 puts the data.

In some embodiments, the memory controller 16 or other hardware aspects of the computer system 10 may operate to expose the "put" and "get" memory locations to the debugger for the purposes of the "Step Across" function illustrated in FIG. 2. In other embodiments, the compiler and/or the debugger are operative to determine the "put" and "get" memory locations.

Following 208 in FIG. 2, the debugger causes the program that is being debugged to run (as indicated at 210) to the next get instruction in, e.g., a thread other than the thread to which the "put" instruction 306 belongs. It is then determined, at 212, whether the memory location from which the "get" instruction identified at 210 gets data matches the memory location to which the "put" instruction 306 put data. If there is no match, the process of FIG. 2 loops back to 210. The loop of 210, 212 continues until a match is found between the memory address from which the identified "get" instruction operates and the memory address to which the "put" instruction 306 put its data. On the occasion of a match, 214 follows 212, and the debugger causes the program that is being debugged to stop at the "get" instruction which operates with respect to the matching memory address. It may be presumed that this "get" instruction is in a thread that is different from the thread of the "put" instruction 306.

At this time, as indicated at 216, the debugger clears all breakpoints set at 208. Next, as indicated at 218, the user may proceed to undertake typical diagnostic activities at the "get" instruction stopped at 214. These activities may include examining the current values of one or more variables and/or examining the contents of one or more memory locations.

In some embodiments, the debugger may also check for underflow or overflow conditions with respect to the queue to which the "put" instruction put the data. If such a condition is found, the debugger may present an error message to the user.

The "Step Across" function described with respect to FIG. 2 allows a user to follow data across boundaries between threads, from a producing thread to a consuming thread, so that the user is better able to trace multi-threaded operation of a program that is being debugged.

Figure 5:
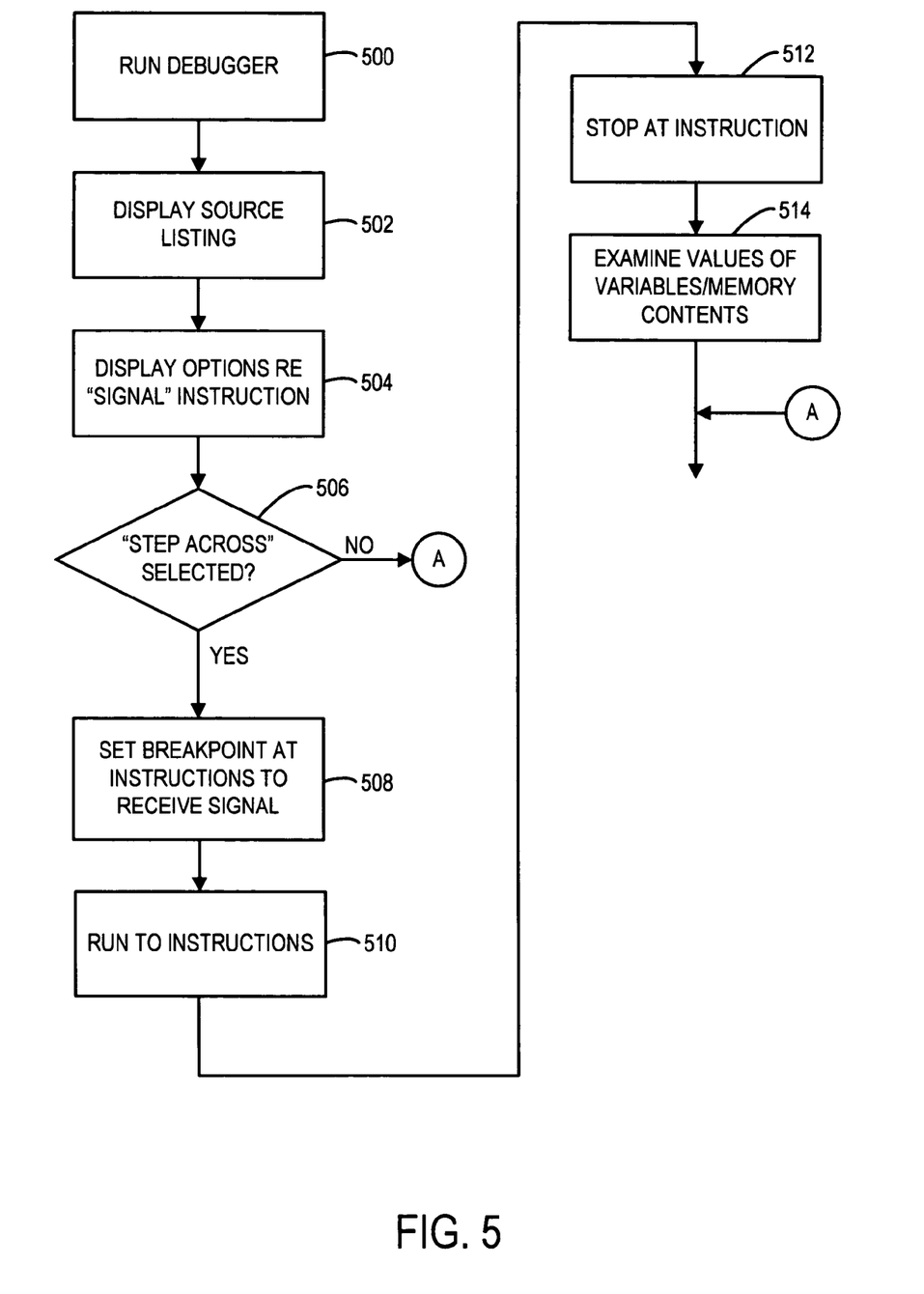
FIG. 5 is a flow chart that illustrates another function of a debugging tool according to some embodiments.

FIG. 5 is a flow chart that illustrates another function of a debugging tool according to some embodiments.

At 500 in FIG. 5, the debugger is caused to execute on the second processor 14. As part of operation of the computer system under (at least partial control) of the debugger, a screen display having a source listing 304a (FIG. 6) may be displayed to the user via the display device, as per 502 in FIG. 5. The source listing 304a lists source code program instructions of the program that is being debugged. It will be assumed that the program supports multi-threaded operation, either by design or as a result of partitioning by the compiler. It will also be assumed that the "signal" instruction 600 included in the source listing 304a is part of a first execution thread of the program and operates to send a synchronization signal to another thread of the program. The synchronization signal may be, for example, a bit that is set or cleared in a particular register location.

The "signal" instruction 600 may be selected by the user by, for example, using the mouse 22 (FIG. 1) to position a cursor 400 (FIG. 6) adjacent to the "signal" instruction 600 and then, e.g., "right-clicking". In response to the "right-clicking" (i.e., in response to the selecting of the "signal" instruction), the context menu 402 is again displayed, as indicated at 504 in FIG. 5. The context menu 402 includes the "Step Across" option 404 (FIG. 6), which is available with respect to the "signal" instruction 600. As will be seen, the "Step Across" option works somewhat differently with respect to the "signal" instruction from its operation with respect to a "put" instruction, but to substantially the same effect, in that the user is allowed to easily trace operation of the program that is being debugged across thread boundaries.

At 506 in FIG. 5, it is determined whether the user has selected the "Step Across" option 404 presented with respect to the "signal" instruction. As before, selection of the "Step Across" option may occur by, e.g., the user operating the mouse 22 and/or the keyboard. If it is determined that the user has selected the "Step Across" option with respect to the "signal" instruction, the debugger sets a breakpoint (as indicated at 508 in FIG. 5) at the instruction in another thread which receives the signal sent by the "signal" instruction.

Following 508 in FIG. 5, the debugger causes the program that is being debugged to run (as indicated at 510) to the instruction (in another thread) that receives the signal sent by the signal instruction 600 of the first thread. The debugger then causes (512 in FIG. 5) the program that is being debugged to stop at the instruction that receives the signal. Next, as indicated at 514, the user may proceed to undertake typical diagnostic activities at the instruction stopped at 512.

These activities may include examining the current values of one or more variables and/or examining the contents of one or more memory locations.

The "Step Across" function described with respect to FIG. 5, and applied to a synchronizing signal passed between execution threads of a multi-threaded program, allows a user (debugging programmer) to more readily trace the interactions between threads of a program that is being debugged, thereby aiding in effective debugging of a multi-threaded program.

Figure 6:
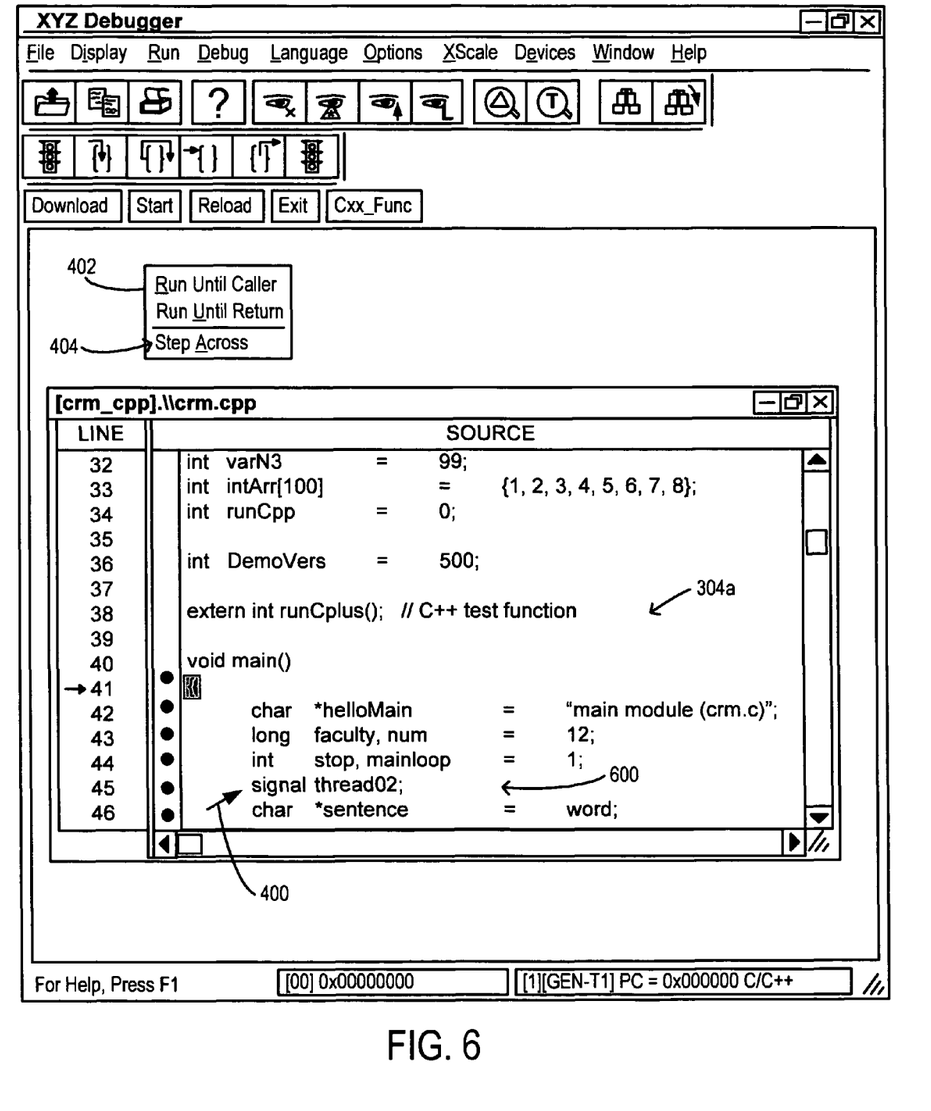
FIG. 6 is an example screen display that may be provided in accordance with the function of FIG. 5.

Although not shown in FIG. 6, the context menu 402 may also include conventional "Step Over" and "Step Into" options.

Figure 7A:
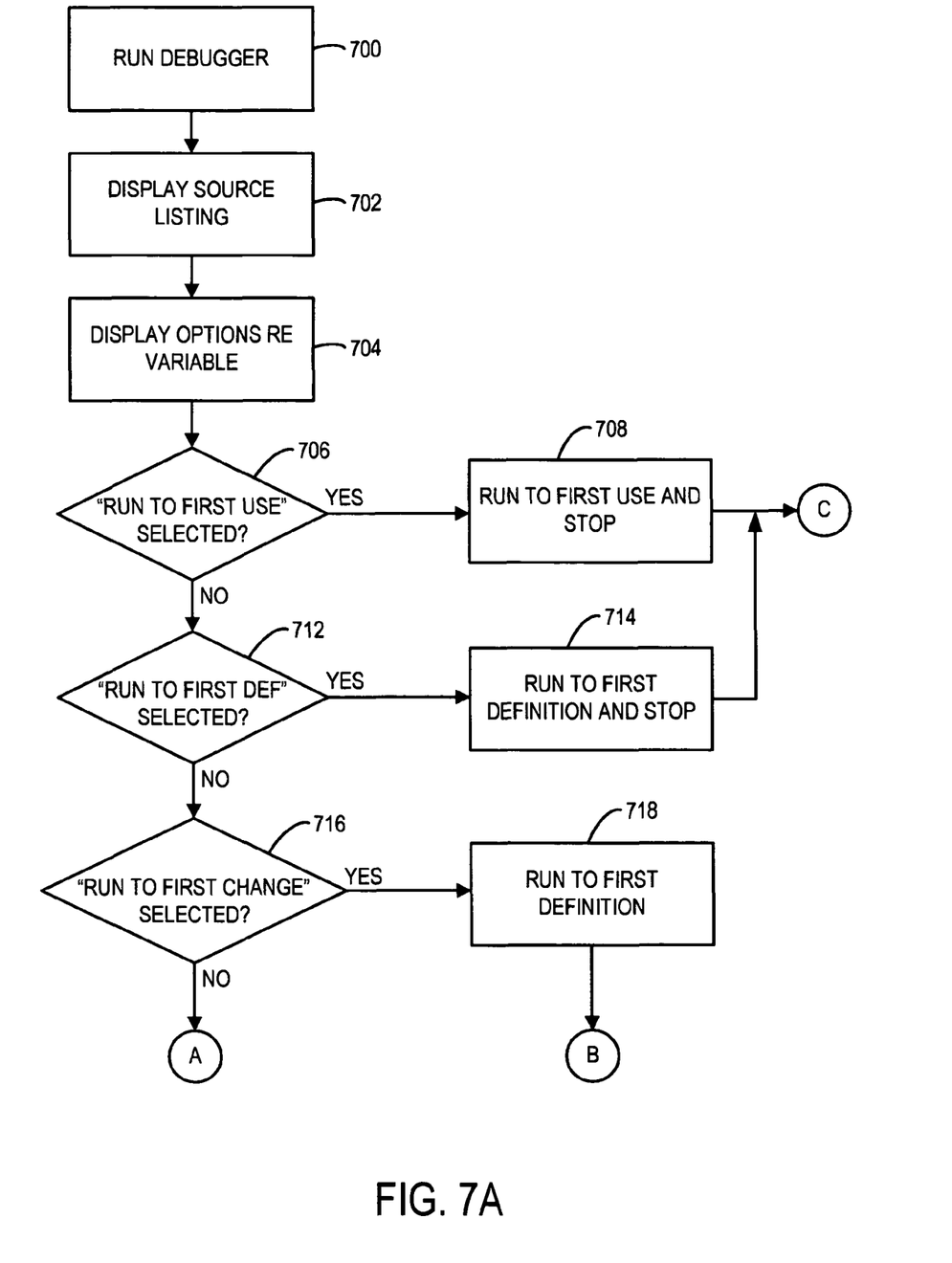
FIGS. 7A and 7B together form a flow chart that illustrates still other functions of a debugging tool according to some embodiments.
Figure 7B:
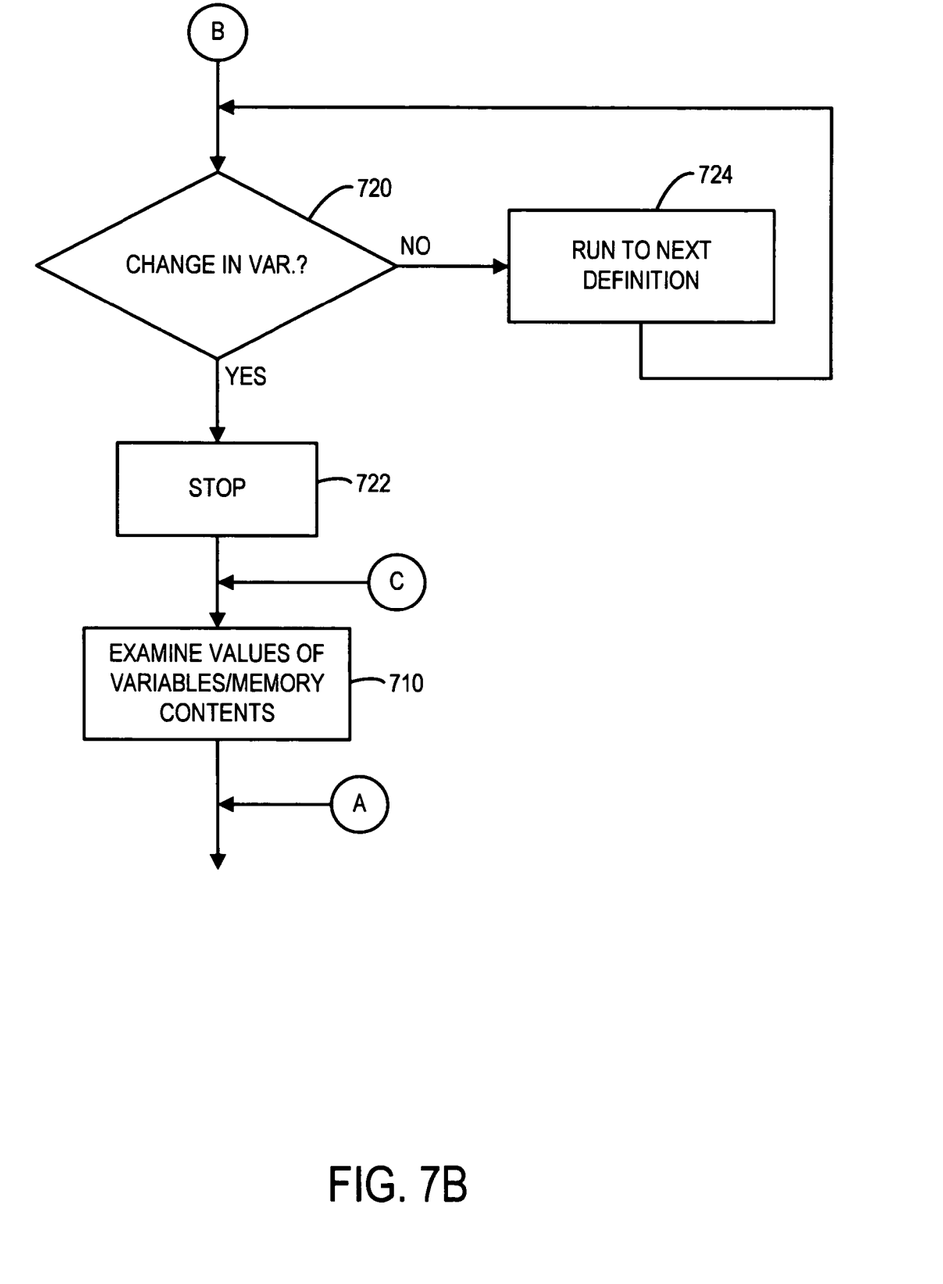

FIGS. 7A and 7B together form a flow chart that illustrates still other functions of a debugging tool according to some embodiments.

At 700 in FIG. 7A, the debugger is caused to run on the second processor 14. As part of the operation of the computer system under (at least partial) control of the debugger, a source listing 304b (FIG. 8) is displayed (as per 702 in FIG. 7A) that includes source code program instructions of a program that is being debugged. In various embodiments of the invention, the program that is being debugged may or may not be a multi-threaded program.

A variable 800 (in this example indicated as "var1"), in an instruction 801 included in the source listing 304b, may be selected by the user by, for example, using the mouse 22 (FIG. 1) to position the cursor 400 (FIG. 8) adjacent to the variable 800 and then, e.g., right-clicking. In response to the selection of the variable 800 (whether by right-clicking or, in some embodiments, simply by placement of the cursor 400 on the variable) a context menu 802 is displayed, as indicated at 704 in FIG. 7A. The context menu 802 includes a "Run to First Use" option 804 (FIG. 8) with respect to the selected variable, a "Run to First Def" (run to first definition) option 806 with respect to the selected variable, and a "Run to First Change" option 808 with respect to the selected variable.

Figure 8:
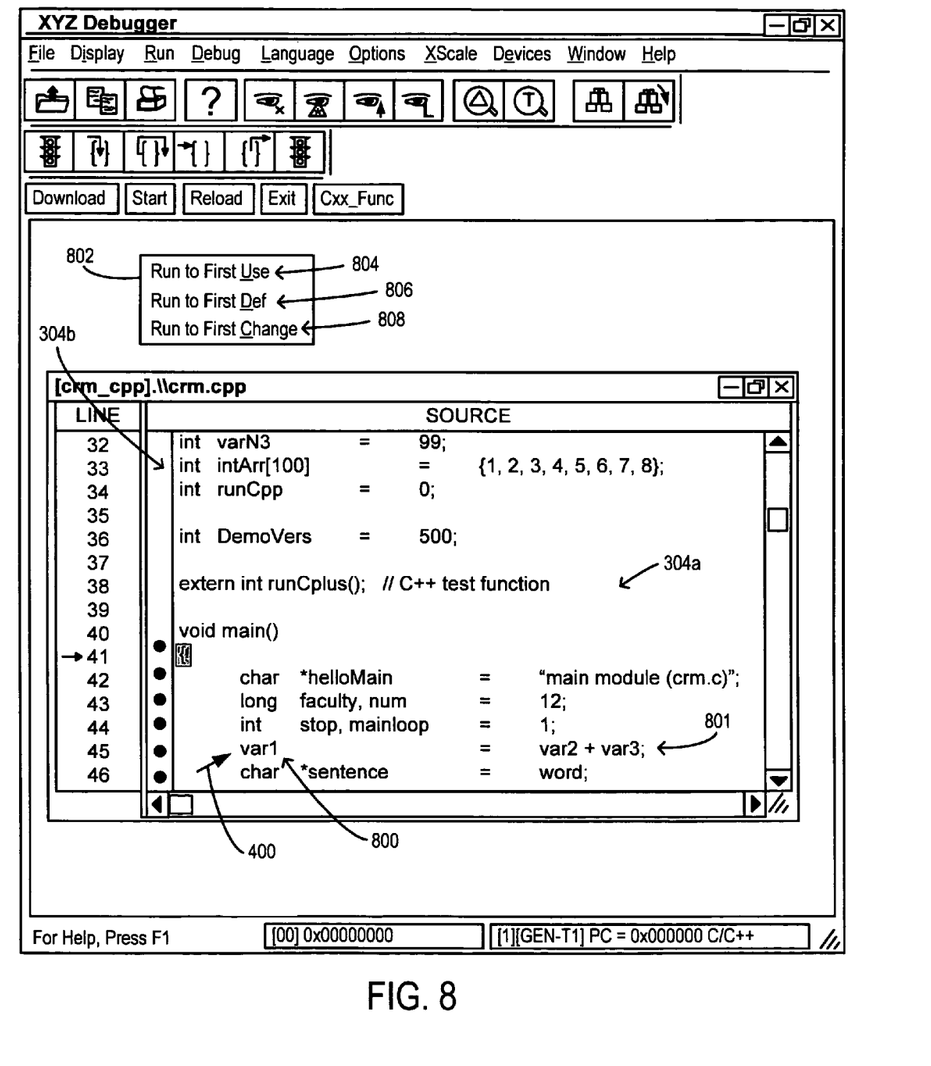
FIG. 8 is an example screen display that may be provided in accordance with the function of FIGS. 7A and 7B.

It is then determined, at 706 in FIG. 7A, whether the user has selected the "Run to First Use" option 804. If such is the case, then, as indicated at 708, the debugger causes the program that is being debugged to run to the next instruction (after instruction 801) in which the selected variable 800 is used. Upon such next instruction (which may or may not be in the same thread with the instruction 801) being reached and identified, the execution of the program that is being debugged is stopped. Next, as indicated at 710 (FIG. 7B), the user may proceed to undertake typical diagnostic activities at the instruction stopped at 708. These activities may include examining the current values of one or more variables (including, e.g., the selected variable) and/or examining the contents of one or more memory locations.

Referring again to 706 in FIG. 7A, if the "Run to First Use" option 804 is not selected, it is next determined, at 712 in FIG. 7A, whether the user has selected the "Run to First Def" option 806. If such is the case, then, as indicated at 714, the debugger causes the program that is being debugged to run to the next instruction (after instruction 801) in which the selected variable is defined. Upon such next instruction (which may or may not be in the same thread with the instruction 801) being reached and identified, the execution of the program that is being debugged is stopped. The process of FIGS. 7A and 7B then advances to 710 (FIG. 7B), at which the user may proceed to undertake typical diagnostic activities at the instruction stopped at 714. These activities may include examining the current values of one or more variables (including, e.g., the selected variable) and/or examining the contents of one or more memory locations.

Referring again to 712 in FIG. 7A, if the "Run to First Def" option 806 is not selected, it is next determined, at 716 in FIG. 7A, whether the user has selected the "Run to First Change" option 808. (It is noted that not every definition of the value of a variable results in a change in the value of the variable.) If a positive determination is made at 716 (i.e., if the "Run to First Change" option 808 was selected), the debugger causes the program that is being debugged to run (as indicated at 718, FIG. 7A) to the next instruction (after instruction 801) in which the selected variable is defined. Upon such next instruction (which may or may not be in the same thread with the instruction 801) being reached and identified, it is determined (as indicated at 720, FIG. 7B) whether the definition of the selected variable in the identified next instruction resulted in a change in the value of the variable. If such is the case, execution of the program that is being debugged is stopped, as indicated at 722. The process then advances to 710, at which the user may proceed to undertake typical diagnostic activities at the instruction stopped at 722. These activities may include examining the current values of one or more variables (including, e.g., the selected variable) and/or examining the contents of one or more memory locations.

Referring again to 720, if it is determined that the definition of the selected variable in the identified next instruction did not result in a change in the value of the variable, then the debugger causes the program that is being debugged to run (as indicated at 724) to the next instruction (after the identified instruction) in which the selected variable is defined. The process then loops back to 720, at which it is determined whether the newly identified instruction results in a change in the value of the selected variable. The loop of 720, 724 may continue until an instruction is reached in which the value of the selected variable is changed.

In connection with all of these options, the debugger may make use of information available from the compiler in regard to uses of the selected variable, and breakpoints may be set accordingly. Upon hitting the first breakpoint required for the "run to" function, all are cleared.

The process of FIGS. 7A and 7B allows the user (debugging programmer) to trace uses/definitions/changes in value of a variable without resorting to a labor-intensive and time-consuming post-mortem review of a voluminous execution history file.

The process of FIGS. 7A and 7B may be applied to debugging of single-threaded as well as multi-threaded programs. Particular embodiments may omit, for example, one or two of the three "Run to" options illustrated in FIGS. 7A and 7B.

More generally, a debugger according to some embodiments may include any one or more of the features described herein.

Although the embodiments described above have been illustrated in conjunction with a multi-processor system, in other embodiments a debugger having one or more of the features described above may also run on a single-processor system, with the program to be debugged running on the same processor as the debugger. Moreover, in some embodiments a debugger having one or more of the above-described features may run on a system having more than two processors.

In some embodiments, a debugger having one or more of the above-described features may be executed with regard to a network processor that has 8 or 16 processors, for example.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
running a debugging tool in regard to a program which is undergoing debugging, the program supporting multi-threaded operation;
presenting an option to a user via the debugging tool with respect to a program instruction in a first thread of the program, the program instruction for putting an item of data into a queue at a first memory address;
responsive to the user exercising the option, setting conditional breakpoints for a plurality of program instructions for getting the item of data from the queue, the plurality of program instructions being in a second thread of the program, the second thread being different from the first thread;
executing the program;
responsive to reaching a conditional breakpoint during execution, identifying if the program instruction for the conditional breakpoint includes a second memory address that matches the first memory address; and
if the program instruction for the conditional breakpoint includes the second memory address, stopping execution of the program at the identified program instruction in the second thread; or
if the program instruction for the conditional breakpoint does not include the second memory address, continuing to execute the program until reaching a program instruction for another conditional breakpoint.

2. The method of claim 1, wherein the option is indicated to the user as a "step across" option.

3. The method of claim 1, further comprising:
at the time of execution of the identified program instruction in the second thread, examining at least one of: (a) a current value of at least one variable of the program, and (b) content of at least one memory location.

4. The method of claim 1, wherein the identifying includes:
identifying a "get" program instruction in the second thread of the program; and
determining that the "get" program instruction operates with respect to a memory address that matches a memory address to which the program instruction in the first thread of the program put the item of data.

5. An apparatus comprising:
at least one processor;
at least one memory coupled to the at least one processor, the at least one memory to store a debugging tool and a program which is to undergo debugging, the program to support multi-threaded operation, the at least one processor operative with the debugging tool and the program to:
present an option to a user via the debugging tool with respect to a program instruction in a first thread of the program, the program instruction for putting an item of data into a queue at a first memory address;
responsive to the user exercising the option, setting conditional breakpoints for a plurality of program instructions for getting the item of data from the queue, the plurality of program instructions beinq in a second thread of the program, the second thread being different from the first thread;
execute the program;
responsive to a conditional breakpoint being reached during execution, identify if the program instruction for the conditional breakpoint includes a second memory address that matches the first memory address; and if the program instruction for the conditional breakpoint includes the second memory address, stop execution of the program at the identified program instruction in the second thread; or if the program instruction for the conditional breakpoint does not include the second memory address, continue to execute the program until reaching a program instruction for another conditional breakpoint.

6. The apparatus of claim 5, wherein the option is indicated to the user as a "step across" option.

7. The apparatus of claim 5, wherein the identifying includes:

identifying a "get" program instruction in the second thread of the program; and determining that the "get" program instruction operates with respect to a memory address that matches a memory address to which the program instruction in the first thread of the program put the item of data.

8. An apparatus comprising:

a storage medium having stored thereon instructions that when executed by a machine result in the following:

running a debugging tool in regard to a program which is undergoing debugging, the program supporting multi-threaded operation;

presenting an option to a user via the debugging tool with respect to a program instruction in a first thread of the program, the program instruction for putting an item of data into a queue at a first memory address;

responsive to the user exercising the option, setting conditional breakpoints for a plurality of program instructions for getting the item of data from the queue, the plurality of program instructions being in a second thread of the program, the second thread being different from the first thread;

executing the program;

responsive to reaching a conditional breakpoint, identifying if the program instruction for the conditional breakpoint includes a second memory address that matches the first memory address; and if the program instruction for the conditional breakpoint includes the second memory address, stopping execution of the program at the identified program instruction in the second thread; or if the program instruction for the conditional breakpoint does not include the second memory address, continuing to execute the program until reaching a program instruction for another conditional breakpoint.

9. The apparatus of claim 8, wherein the option is indicated to the user as a "step across" option.

10. The apparatus of claim 8, wherein the identifying includes:

identifying a "get" program instruction in the second thread of the program; and determining that the "get" program instruction operates with respect to a memory address that matches a memory address to which the program instruction in the first thread of the program put the item of data.

\* \* \* \* \*